United States Patent [19]
Toner et al.

[11] Patent Number: 5,088,227
[45] Date of Patent: Feb. 18, 1992

[54] SIMULATED FROG FISHING LURE

[76] Inventors: Jeffrey T. Toner; Christopher Winterroll, both of 10 Violet Ave., Hicksville, N.Y. 11801

[21] Appl. No.: 646,819
[22] Filed: Jan. 28, 1991
[51] Int. Cl.⁵ .............................................. A01K 85/00
[52] U.S. Cl. ..................................... 43/42.3; 43/42.02
[58] Field of Search ...................... 43/42, 42.3, 42.02, 43/42.28

[56] References Cited

U.S. PATENT DOCUMENTS

| | | | |
|---|---|---|---|
| 803,134 | 10/1905 | Rhodes | 43/42.02 |
| 941,911 | 11/1909 | Burthe | 43/42.02 |
| 2,534,482 | 12/1950 | Terhorst | 43/42.3 |
| 2,607,151 | 8/1952 | Morris et al. | 43/42.3 |

Primary Examiner—Kurt Rowan
Assistant Examiner—James Miner
Attorney, Agent, or Firm—Leon Gilden

[57] ABSTRACT

A frog-like, relatively rigid body portion includes a first body rod reciprocatably mounted through the body arranged parallel to a second body rod, with a connector bar slidably mounted overlying the second body rod and fixedly mounted to the first body rod, whereupon reciprocation of the first body rod effects oscillation of leg portions of the frog-like body. Each of the legs includes a jointed member and includes spring portions to effect oscillation of the leg members upon reciprocation of the first body rod in simulation of a swimming frog-like creature.

5 Claims, 3 Drawing Sheets

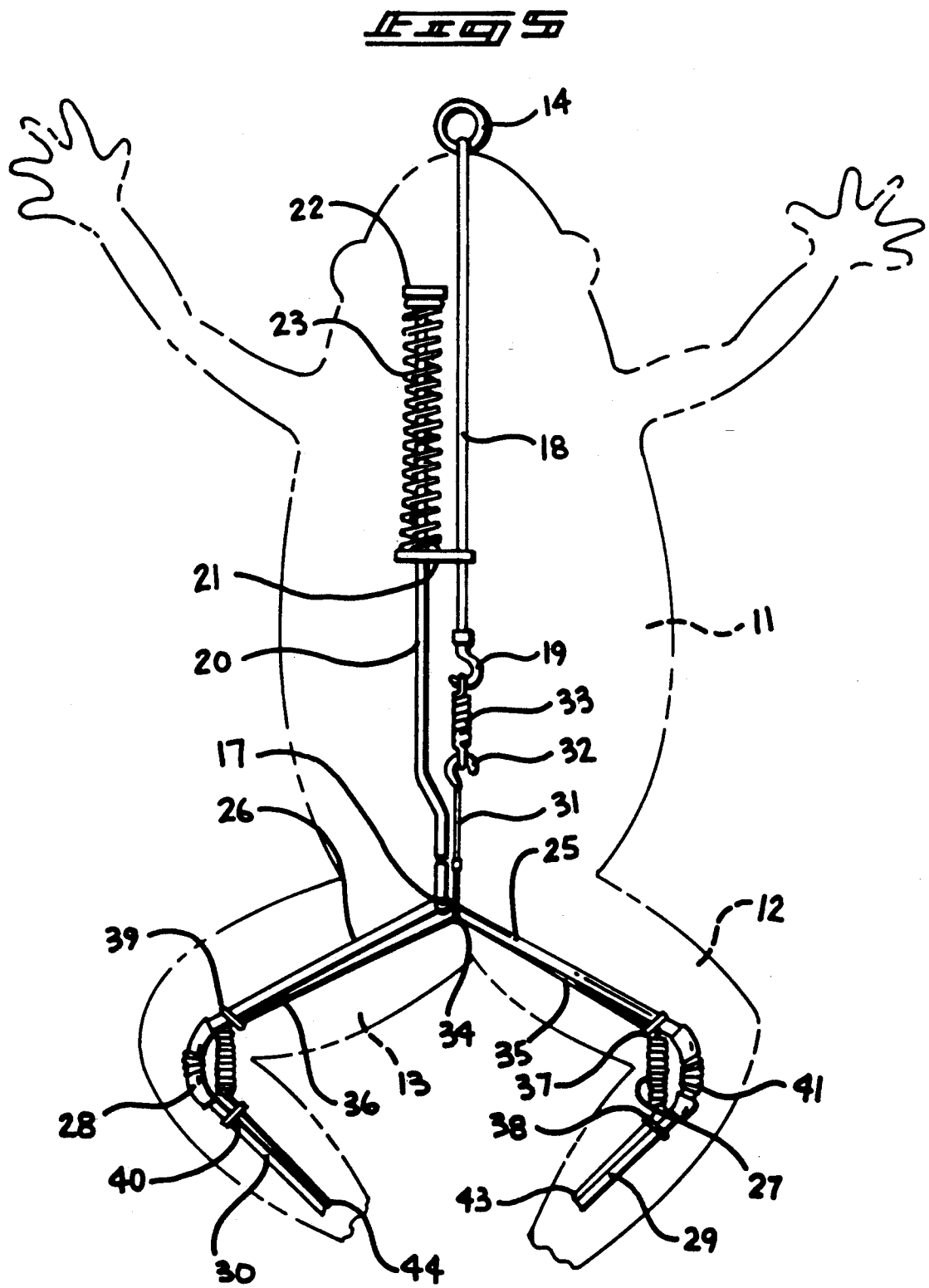

SIMULATED FROG FISHING LURE

BACKGROUND OF THE INVENTION

1. Field of the Invention

The field of invention relates to fishing lures, and more particularly pertains to a new and improved simulated frog fishing lure to provide an animated attracting organization for use in attracting game fish.

2. Description of the Prior Art

The use of fishing lures to attract various categories of fish is well known in the prior art. Various animated movements, as well as bright surfaces have been utilized to attract types of fish. Frog-like lures to attract various game fish, such as large and small mouth bass are known in the prior art that feed on such creatures. Examples of the prior art include U.S. Pat. No. 4,567,685 to Duncan setting forth a simulated frog fishing lure wherein the frog includes a hinged body member to pivot the body member relative to a head portion of the lure.

U.S. Pat. No. 4,885,867 to Leal sets forth a frog fishing lure wherein a rearwardly directed tail portion is formed of a material to effect a vibrational motion as it is directed through the water.

U.S. Pat. No. 4,619,069 to Strickland sets forth a doubled tailed fish bait member wherein the appendages are of a flexible material and effect motion as they are directed through the water.

U.S. Pat. No. Des. 255,376 to Hogreff sets forth a design configuration of a frog-like fishing lure.

As such, it may be appreciated that there continues to be a need for a new and improved simulated frog fishing lure as set forth by the instant invention which addresses both the problems of ease of use as well as effectiveness in construction in attracting of game fish and in this respect, the present invention substantially fulfills this need.

SUMMARY OF THE INVENTION

In view of the foregoing disadvantages inherent in the known types of fishing lures now present in the prior art, the present invention provides a simulated frog fishing lure wherein the same utilizes leg appendages that are directed to oscillate upon reciprocation of a body length directed through the fishing lure. As such, the general purpose of the present invention, which will be described subsequently in greater detail, is to provide a new and improved simulated frog fishing lure which has all the advantages of the prior art fishing lures and none of the disadvantages.

To attain this, the present invention provides a frog-like, relatively rigid body portion including a first body rod reciprocatably mounted through the body arranged parallel to a second body rod, with a connector bar slidably mounted overlying the second body rod and fixedly mounted to the first body rod, whereupon reciprocation of the first body rod effects oscillation of leg portions of the frog-like body. Each of the legs includes a jointed member and includes spring portions to effect oscillation of the leg members upon reciprocation of the first body rod in simulation of a swimming frog-like creature.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved simulated frog fishing lure which has all the advantages of the prior art fishing lures and none of the disadvantages.

It is another object of the present invention to provide a new and improved simulated frog fishing lure which may be easily and efficiently manufactured and marketed.

It is a further object of the present invention to provide a new and improved simulated frog fishing lure which is of a durable and reliable construction.

An even further object of the present invention is to provide a new and improved simulated frog fishing lure which is susceptible of a low cost of manufacture with regard to both materials and labor, and which accordingly is then susceptible of low prices of sale to the consuming public, thereby making such simulated frog fishing lures economically available to the buying public.

Still yet another object of the present invention is to provide a new and improved simulated frog fishing lure which provides in the apparatuses and methods of the prior art some of the advantages thereof, while simultaneously overcoming some of the disadvantages normally associated therewith.

Still another object of the present invention is to provide a new and improved simulated frog fishing lure wherein the same is arranged to provide animated motion of a frog-like fishing lure as it is directed through fishing waters to simulate a live swimming frog member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic top view illustrating the operative mechanism utilized by the instant invention.

DESCRIPTION OF THE PREFERRED EMBODIMENT

Figure 1:
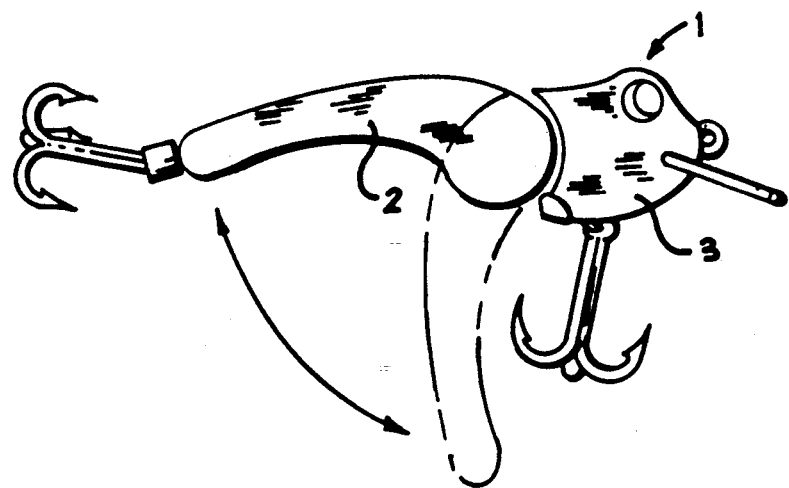
FIG. 1 is an orthographic side view, taken in elevation, of a prior art simulated frog fishing lure.
Figure 2:
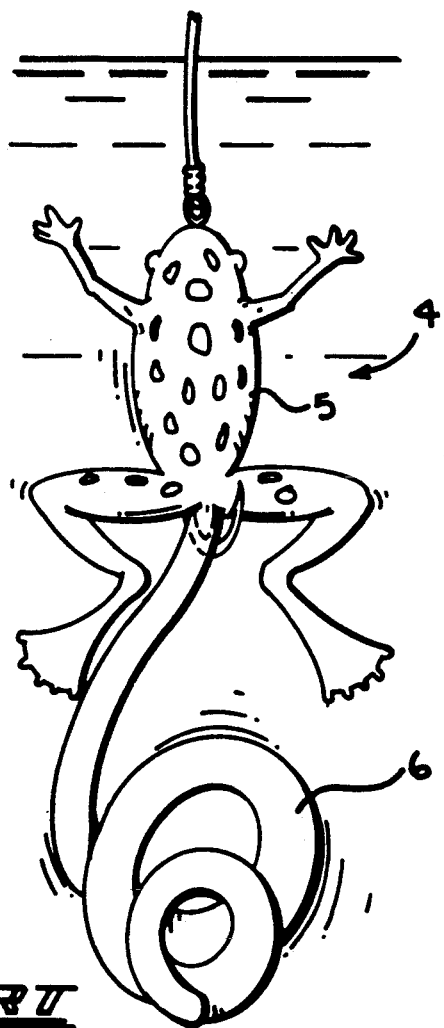
FIG. 2 is an orthographic top view of a prior art simulated frog fishing lure.
Figure 3:
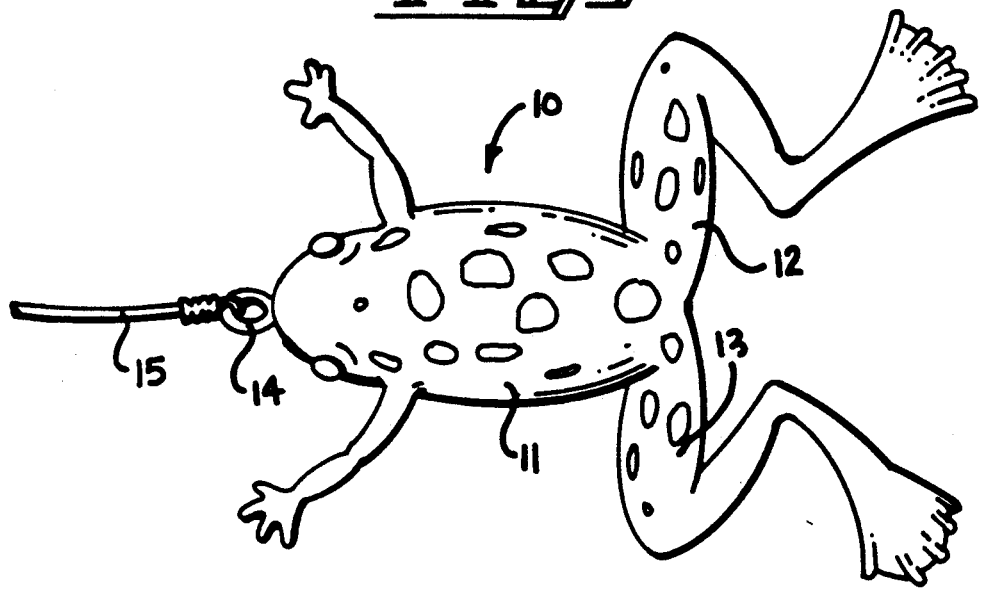
FIG. 3 is an orthographic top view of the instant invention.

With reference now to the drawings, and in particular to FIGS. 1 to 5 thereof, a new and improved simulated frog fishing lure embodying the principles and concepts of the present invention and generally designated by the reference numeral 10 will be described.

FIG. 1 illustrates a prior art frog fishing lure 1, utilizing a body portion 2 that is pivotally mounted relative to a head portion 3, in a manner as set forth in U.S. Pat. No. 4,567,685. Further, U.S. Pat. No. 4,885,867 sets forth a fishing lure 4, wherein the body portion 5 utilizes a tail-like member 6 that effects circular vibrational motion of the water as the tail-like member is directed therethrough.

Figure 4:
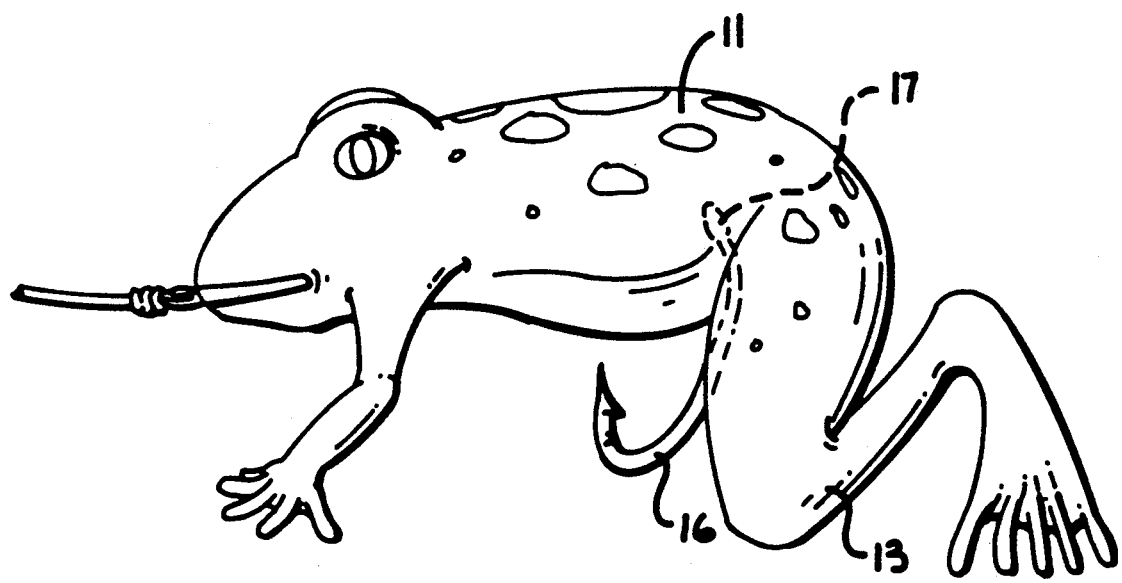
FIG. 4 is an orthographic side view, taken in elevation, of the instant invention.

More specifically, the simulated frog fishing lure 10 of the instant invention essentially comprises a rigid body portion 11, including a plurality of flexible leg members defined by a flexible right and left leg member 12 and 13 respectively. A loop member 14 is positioned exteriorly of the rigid body portion 11 and coaxially aligned therewith. The loop member 14 permits securement of a fishing line 15 thereto. A fishing hook 16 extends exteriorly of a bottom surface of the body portion 11, as illustrated in FIG. 4, and is mounted to a leg intersection 17 (see FIGS. 4 and 5). The fishing hook 16 is oriented orthogonally relative to a respective first right and left leg rod 25 and 26 that define an acute included angle therebetween.

Reference to FIG. 5 illustrates use of the organization to effect oscillation of the right and left leg members 12 and 13 in use. A first body rod 18 extends longitudinally of the body portion 11 including the loop member 14 fixedly mounted to the outer terminal end thereof. An inner terminal end of the first body rod 18 includes a first body rod attachment portion defined as a hook 19. A second body rod 20 is arranged generally parallel to the first body rod, wherein a connector bar 21 fixedly and orthogonally mounted to the first body rod 18 slidably receives the second body rod therethrough. A body positioning plate 22 is fixedly mounted within the body portion 11, wherein a first spring member 23 is captured between the plate 22 and the connector bar 21 to normally bias the first body rod 18 in a retracted orientation, as illustrated in FIG. 5. The first right leg rod 25 and the first left leg rod 26 are fixedly mounted to the second body rod 20 at the leg intersection 17, with the fishing hook 16 orthogonally mounted to the intersection as noted above and as illustrated in FIG. 4 for example. The first right leg rod 25 includes a right leg pivot connection 27, wherein the first left leg rod 26 includes a left leg pivot connection 28. Accordingly, a second right leg rod 29 is mounted to the right leg pivot connection 27 and a second left leg rod 30 is mounted to the left pivot connection 28. To effect oscillation of the second right and left leg rods 29 and 30 respectively, an elongate, flexible actuator line 31 is secured to the first body attachment portion 19 through a second spring member 33. The second spring member 33 enhances oscillation of the flexible actuator line 31 when the loop member 14 is projected exteriorly of the rigid body portion 11 by the fishing line 15. A flexible actuator line connector 32 defined by a further hook is secured to the opposed end of the second spring member 33 to that mounted to the spring member by the first body rod attachment portion 19. An actuator line junction 34 is positioned between the first right and left leg rods 25 and 26 and includes a right actuator line member 35 and a left actuator line member 36 extending laterally along the respective first right and left leg rods 25 and 26. The first right leg rod 25 includes a first right guide bar 37 fixedly mounted thereto, with a second right guide bar 38 fixedly mounted to the second right leg rod 29. The first and second right guide bars 37 and 38 slidably direct the right actuator line member 35 therethrough, with a right coil spring member 41 secured to the first and second right guide bars 37 and 38, with the right actuator line member 35 directed coextensively through the right cross spring member 41 as it is directed from the first right leg rod 25 to the second right leg rod 29. A right line attachment point 43 fixedly mounts the outer terminal end of the right actuator line member 35 to the second right leg rod 29 spaced from the second right guide bar 38.

Similarly, the left actuator line member 36 is slidably directed through a first left guide bar 39 fixedly mounted to the first left leg rod 26 and extends coaxially through a left coil spring member 42 that is mounted at one end to the first left guide bar 39 and at its other end to a second left guide bar 40 that in turn is fixedly mounted to the second left leg rod 30, wherein the first and second left guide bars 39 and 40 are spaced from the left leg pivot connection 28. A left line attachment point 44 fixedly secures the outer terminal end of the left actuator line member 36 to the second left leg rod 30 spaced from the second left guide bar 40. The right and left cross members 41 and 42 normally bias the second right and left leg rods 29 and 30 in an extended configuration, whereupon tension applied to the first body rod 18 directs the second right and left leg rods 29 and 30 towards their respective first right and left leg rods 25 and 26. The use of the coil springs enhances oscillation of the right and left leg members 12 and 13 simulating a frog swimming in use. Further, the dampening action of the water in use of the springs enhances a realistic effect of the oscillation defined by the right and left leg members 12 and 13 as the fishing line 15 directs force to the first body rod 18 and extends the first body rod exteriorly of the body during use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A simulated frog fishing lure comprising, in combination,
    an elongate, longitudinally aligned rigid body portion, the rigid body portion including a flexible right leg member and a flexible left leg member mounted to a respective right and left rear end portion of the rigid body portion, and
    a first body rod longitudinally directed through the rigid body portion extending through a forward end of the rigid body portion exteriorly of the rigid body portion, and
    the first body rod reciprocatably mounted within the rigid body portion, and
    an articulated right leg member link mounted within the right leg member, and
    an articulated left leg member link mounted within the left leg member, and
    actuator line means mounted to the first body rod, wherein the actuator line means is further mounted to the right and left leg member links for effecting articulation of the respective right and left leg members upon reciprocation of the first body rod within the rigid body portion, and
    including a second body rod fixedly mounted within the rigid body portion spaced from the first body rod, and a body positioning plate mounted at a forward second body rod portion, and a connector bar orthogonally and fixedly mounted to the first body rod, and the second body rod slidably directed through the connector bar, and a first spring member captured between the connector bar and the body positioning plate to bias the first body rod interiorly of the rigid body portion.

2. An apparatus as set forth in claim 1 wherein the second body rod extends longitudinally of the rigid body portion and wherein the articulate right leg member and the articulated left leg member are joined together at a leg intersection within the rigid body portion adjacent the flexible right leg member and the flexible left leg member, and wherein the articulated right leg member and the articulated left leg member define an acute angle therebetween, and a fishing hook orthogonally and fixedly mounted to the leg intersection within the rigid body portion, and wherein the fishing hook extends exteriorly of the rigid body portion orthogonally oriented relative to the articulated right leg member and the articulated left leg member.

3. An apparatus as set forth in claim 2 including a second spring member mounted between the first body rod and the actuator line means.

4. An apparatus as set forth in claim 3 wherein the articulated right leg member includes first right leg rod and a second right leg rod, and the second right leg rod and the first right leg rod join together by a right leg pivot connection, and the articulated left leg member includes a first left leg rod and second left leg rod joined together by a left leg pivot connection.

5. An apparatus as set forth in claim 4 wherein the first right leg rod includes a first right guide bar fixedly mounted to the first right leg rod adjacent the right leg pivot connection, and the second right leg rod includes a second right guide bar fixedly mounted to the second right leg rod adjacent the right pivot connection, and a right coil spring mounted to the first right guide bar and the second right guide bar to bias the second right leg rod relative to the first right leg rod, and the actuator line means includes a right actuator line member slidably directed through the first right guide bar, the right spring member, and the second right guide bar and fixedly mounted at an outer terminal end of the right actuator line member to the second right leg rod spaced from the second right guide bar, and the actuator line means further includes a left actuator line member, and the first left leg rod including a first left guide bar fixedly mounted to the first left leg rod adjacent the left pivot connection, and the second left leg rod including a second left guide bar fixedly mounted to the second left leg rod adjacent the left pivot connection, and a left coil spring mounted to the first and second left guide bars to bias the first and second left leg rods, and the left actuator line member directed slidably through the first left guide bar, the left coil spring member, and the second left guide bar, and the left actuator line member fixedly mounted to the second left leg rod remote from the second left guide bar.

* * * * *